US009996837B2

(12) United States Patent
Siddens et al.

(10) Patent No.: US 9,996,837 B2
(45) Date of Patent: Jun. 12, 2018

(54) INTEGRATION OF SECURE PROTOCOLS INTO A FRAUD DETECTION SYSTEM

(71) Applicant: VISA INTERNATIONAL SERVICE ASSOCIATION, San Francisco, CA (US)

(72) Inventors: Cory Siddens, Mountain View, CA (US); Craig O'Connell, San Mateo, CA (US); Scott Boding, Mountain View, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 393 days.

(21) Appl. No.: 14/733,785

(22) Filed: Jun. 8, 2015

(65) Prior Publication Data

US 2015/0356562 A1 Dec. 10, 2015

Related U.S. Application Data

(60) Provisional application No. 62/009,005, filed on Jun. 6, 2014.

(51) Int. Cl.
*G06Q 40/00* (2012.01)
*G06Q 20/40* (2012.01)
(Continued)

(52) U.S. Cl.
CPC ....... *G06Q 20/4016* (2013.01); *G06Q 20/405* (2013.01); *G06Q 20/3674* (2013.01);
(Continued)

(58) Field of Classification Search
CPC .. G06Q 20/4016; G06Q 20/405; G06Q 20/40; G06Q 20/425; G06Q 20/401; G06Q 20/382; G06Q 20/3821; G06Q 40/00
(Continued)

(56) References Cited

U.S. PATENT DOCUMENTS 6,157,707 A 12/2000 Baulier et al.
6,330,546 B1 * 12/2001 Gopinathan ........... G06Q 20/00
705/35

(Continued)

OTHER PUBLICATIONS

MasterCard launches new, real-time fraud-fighting solution for PIN debit transactions. (Oct. 4, 2006). Business Wire Retrieved from https://dialog.proquest.com/professional/docview/671187566?accountid=142257 (Year: 2006).*

(Continued)

*Primary Examiner* — Kito R Robinson
(74) *Attorney, Agent, or Firm* — Kilpatrick Townsend & Stockton

(57) ABSTRACT

Embodiments of the present invention are directed to methods and systems for performing a secure authentication process by leveraging the historical transaction data associated with an issuer. The historical transaction data stored at a fraud detection system may include the types of frequency of past authentication processes performed by the issuer, allowing for a determination of the likelihood of an authentication challenge process being applied to a current transaction. A merchant may define merchant rules that define what authentication process, if any, should then be applied to the current transaction based on the likelihood of an authentication challenge process being applied to the current transaction.

19 Claims, 4 Drawing Sheets

(51) Int. Cl.
 *G06Q 20/42* (2012.01)
 *G06Q 20/36* (2012.01)
 *G06Q 20/38* (2012.01)

(52) U.S. Cl.
 CPC ....... *G06Q 20/382* (2013.01); *G06Q 20/3821* (2013.01); *G06Q 20/40* (2013.01); *G06Q 20/401* (2013.01); *G06Q 20/4014* (2013.01); *G06Q 20/425* (2013.01); *G06Q 40/00* (2013.01)

(58) Field of Classification Search
 USPC .......................................................... 705/44
 See application file for complete search history.

(56) References Cited

U.S. PATENT DOCUMENTS

| | | | |
|---|---|---|---|
| 7,251,624 | B1 | 7/2007 | Lee et al. |
| 7,788,195 | B1* | 8/2010 | Subramanian ....... G06N 99/005 706/20 |
| 8,645,266 | B2 | 2/2014 | Balasubramanian et al. |
| 8,762,279 | B2 | 6/2014 | Weller et al. |
| 8,930,709 | B2 | 1/2015 | Navratil et al. |
| 8,949,150 | B2 | 2/2015 | Siddens et al. |
| 8,966,579 | B2 | 2/2015 | Mister et al. |
| 8,978,117 | B2 | 3/2015 | Bentley et al. |
| 9,129,321 | B2 | 9/2015 | Boding et al. |
| 2005/0182708 | A1* | 8/2005 | Moudgal ............... G06Q 40/025 705/38 |
| 2007/0106582 | A1* | 5/2007 | Baker .................. G06Q 10/067 705/35 |
| 2007/0226129 | A1* | 9/2007 | Liao ....................... G06Q 20/10 705/38 |
| 2007/0288641 | A1* | 12/2007 | Lee ........................ G06Q 30/06 709/227 |
| 2011/0282789 | A1* | 11/2011 | Carroll ................... G06Q 20/18 705/44 |
| 2012/0023567 | A1* | 1/2012 | Hammad ............... G06Q 20/12 726/9 |
| 2012/0047072 | A1* | 2/2012 | Larkin ................... G06Q 20/02 705/44 |
| 2012/0203698 | A1* | 8/2012 | Duncan ................. G06Q 20/34 705/44 |
| 2012/0278246 | A1 | 11/2012 | Boding et al. |
| 2013/0013491 | A1* | 1/2013 | Selway ................ G06Q 20/042 705/39 |
| 2014/0279513 | A1* | 9/2014 | Dodds-Brown ....... G06Q 20/10 705/44 |
| 2015/0112870 | A1* | 4/2015 | Nagasundaram .. G06Q 20/3821 705/67 |
| 2015/0269578 | A1* | 9/2015 | Subramanian ..... G06Q 20/4016 705/44 |

OTHER PUBLICATIONS

Mastercard Unveils Two Internet Payment Security Initiatives. (2001). Card News, 16(10), NA. Retrieved from https://dialog.proquest.com/professional/docview/675418828?accountid=142257 (Year: 2001).*

* cited by examiner

INTEGRATION OF SECURE PROTOCOLS INTO A FRAUD DETECTION SYSTEM

CROSS-REFERENCE TO RELATED APPLICATIONS

This application claims the benefit of priority U.S. Provisional Application No. 62/009,005, filed Jun. 6, 2014, titled "INTEGRATION OF SECURE PROTOCOLS INTO A FRAUD DETECTION SYSTEM," which is incorporated by reference in its entirety for all purposes.

BACKGROUND

The Internet has made it increasingly easy for users to conduct electronic commerce and online purchases using merchant websites and mobile applications. However, it has also increased the risks of fraudulent transactions, as well as the risk of data being compromised. Transactions conducted over the Internet can make it very difficult for a merchant or payment processing system to know whether the person conducting the transaction is the actual account holder. Thus, systems have been established to perform risk evaluations and fraud determinations.

Currently, for a typical transaction, merchants first perform a secure authentication process to authenticate the user performing the transaction, proceed through an authorization process to authorize the payment for the transaction, and then send the results to a fraud detection system.

This process is typically performed by merchants to prevent authorization processes being performed for transactions that may be rejected by the fraud detection system. However, one problem with this process is that it requires the merchant to send multiple messages to the fraud detection system and to the secure authentication process for a single transaction. Conducting this process through multiple message calls for a single transaction can be unwieldy, time-consuming, and resource-consuming for merchants in environments with high transaction volumes. Further, this process performs the authentication process in a same way for all transactions, which may not be preferable for some transactions.

Thus, there is a need for new and enhanced methods of integrating a secure authentication process for a transaction into a fraud detection system that are more efficient and less resource-consuming.

Embodiments of the present invention address these and other problems, individually and collectively.

BRIEF SUMMARY

Embodiments of the present invention relate to systems and methods for the efficient processing of transactions using a secure authentication process and a fraud detection system. Embodiments utilize the historical transaction data from previous transactions involving an issuer and/or a specific user to determine the likelihood of an authentication challenge process being applied to a current transaction. Based on this determination, and based on merchant rules indicating how the merchant's transactions are to proceed given the likelihood, the transaction may be processed through the secure authentication process, bypass the secure authentication process and proceed to an authorization process, or be rejected.

One embodiment of the invention is directed to a method comprising, receiving, by a server computer, a transaction message for a transaction performed between a user and a merchant. The method further comprises determining an authorizing entity associated with an account used to perform the transaction, and determining a likelihood of an authentication challenge process being performed by the authorizing entity. The method further comprises retrieving a set of merchant rules associated with the merchant from a merchant database, determining a threshold value for the likelihood of the authentication challenge process based on the set of merchant rules. The method further comprises determining whether to send the transaction through a secure authentication process based on the likelihood of the authentication challenge process and the threshold value.

Another embodiment of invention is directed to a server computer comprising: a processor and a computer readable medium coupled to the processor, the computer readable medium comprising code, executable by the processor to implement a method comprising, receiving, by a server computer, a transaction message for a transaction performed between a user and a merchant. The method further comprises determining an authorizing entity associated with an account used to perform the transaction, and determining a likelihood of an authentication challenge process being performed by the authorizing entity. The method further comprises retrieving a set of merchant rules associated with the merchant from a merchant database, determining a threshold value for the likelihood of the authentication challenge process based on the set of merchant rules. The method further comprises determining whether to send the transaction through a secure authentication process based on the likelihood of the authentication challenge process and the threshold value.

These and other embodiments of the invention are described in further detail below with reference to the Drawings and the Detailed Description.

TERMS

Figure 1:
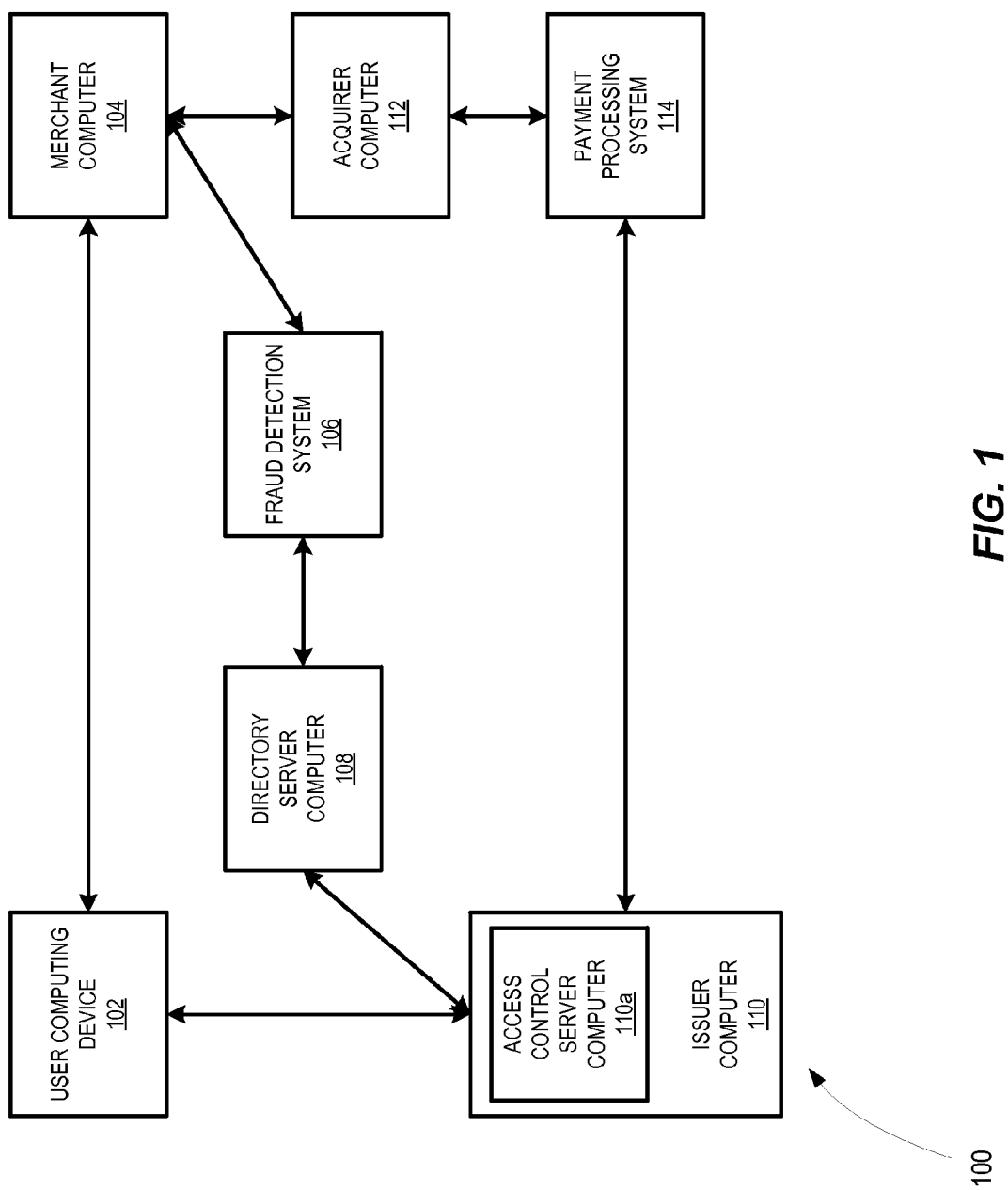
FIG. 1 shows a block diagram of a transaction processing system according to an embodiment of the present invention.

Prior to discussing embodiments of the invention, descriptions of some terms may be helpful in providing a better understanding of the invention.

The term "user" may refer to an individual or entity. The user may be an individual interacting with a user computing device (e.g., a mobile phone or tablet). The user may be a consumer or business that is associated with an account and whose account can be used to conduct transactions, including a payment transaction.

The term "user computing device" may refer to a device that can be used to communicate with another device or system. It can include a user computing device that is used to conduct a transaction. The user computing device may be capable of conducting communications over a network. A user computing device may be in any suitable form. For example, suitable user computing devices can be hand-held and compact so that it can fit into a user's wallet and/or pocket (e.g., pocket-sized). The user computing device can include a processor, and memory, input devices, and output devices, operatively coupled to the processor. Specific examples of user computing devices include cellular or mobile phones, tablet computers, desktop computers personal digital assistants (PDAs), pagers, portable computers, smart cards, and the like. Additional user computing devices may include wearable devices, such as smart watches, glasses fitness bands, ankle bracelets, rings, earrings, etc. In some embodiments, the user computing device may include automobiles with remote communication capabilities.

The term "user data" may include data that regarding a user. User data may include a name, mailing address, shipping address, phone number, payment account number, date of birth, marital status, income, social security number, demographic data, etc. In some embodiments, user data may also include user preferences, notification methods, and prior transaction history.

The term "identifier" may refer to any information that may be used to identify information. In some embodiments, the identifier may be a special value generated randomly or according to a predetermined algorithm, code, or shared secret. For example, an authorizing entity identifier may be a value or number associated with a authorizing entity (e.g., a bank identification number). In another example, an account identifier may be used to uniquely identify an account. In some embodiments, the identifier may be one or more graphics, a token, a bar code, a QR code, or any other information that may be used to uniquely identify an entity.

The term "transaction" may include an exchange or interaction between two entities. In some embodiments, a transaction may refer to a transfer of value between two users (e.g., individuals or entities). A transaction may involve the exchange of monetary funds, or the exchange of goods or services for monetary funds between two individuals or entities. In other embodiments, the transaction may be a purchase transaction involving an individual or entity purchasing goods or services from a merchant or other entity in exchange for monetary funds. In other embodiments, the transaction may be a non-financial transaction, such as exchanging of data or information between two entities, such as the transfer of data. Examples of non-financial transactions may include transactions verifying a user's age or identity (e.g., verifying identity with a government agency, verifying age for the purchase of alcohol) for access to a computer system or a venue.

The term "transaction data" may include data that regarding a transaction. Transaction data may include data for a specific transaction, including items purchased, item prices, total cost, shipping address, payment methods, merchant data, etc. In some embodiments, transaction data may be generated when the user attempts to initiate a transaction for processing. In other embodiments, transaction data may be generated and sent based on items added to a user's shopping cart. Transaction data may also include historical transaction data for prior transactions.

The term "message" may include any data or information that may be transported from one entity to another entity (e.g., one computing device to another computing device). Messages may be communicated internally between devices/components within a computer or computing system or externally between devices over a communications network. Additionally, messages may be modified, altered, or otherwise changed to comprise encrypted or anonymized information.

A "challenge request message" may include a message sent as part of an authentication process for a transaction. In some embodiments, the challenge request message may contain a request for the user to submit a pre-established secure data element (e.g., a password, PIN, or code) in order to authenticate an account or a transaction. The challenge request message may be generated and sent prior to authenticating the account or the transaction.

A "challenge response message" may include a message sent as part of an authentication process for a transaction. In some embodiments, the challenge response message may be transmitted from a user computing device to an access control server computer or a directory server computer. The challenge response message may contain a response from the user computing device to the challenge request message comprising a pre-established secure data element in order to authenticate an account or transaction.

A "risk level" may include results of a risk analysis or evaluation. A risk level may be in the form of a numeric or an alphanumeric value, such as a number from 1-10 or a letter from A-Z. A risk level may indicate a relative degree of risk in a particular situation, such as a transaction. In some cases, a higher risk level may indicate high risk, while a lower risk level may indicate low risk.

A "threshold" may refer to a boundary value. A value compared to the value of the threshold may be used to determine an action to perform. A threshold may be a numerical value in which values below the threshold result in the performance of a first set of actions, and values above the threshold result in the performance of a second set of actions. In some embodiments, the threshold may be a pre-established value.

The term "initiating" may include the first steps taken in order to begin a process or the steps conducted in order to complete a process. For example, "initiating an authorization process for the transaction" can refer to the actual process required to authorize the transaction. However, "initiating an authorization process for the transaction" can also refer to the process of sending a message from one computer to another computer, with instructions for performing the process required to authorize the transaction.

The term "authorization process" may include a process for authorizing a transaction. In some embodiments, an authorization process involves a payment processing server computer and an authorizing computer (e.g., an issuer computer) associated with an account. In some embodiments, the authorization process may involve the generation and sending of authorization request messages to an issuer computer to authorize a financial transaction involving a user account issued by an issuer associated with the issuer computer, and an authorization response message from the issuer computer indicating an authorization or rejection of the transaction.

The term "secure authentication process" may refer to a process for performing authentications. The secure authentication process may be used to authenticate a user or a transaction. In some embodiments, the secure authentication process may be an active authentication where a user is prompted to provide authentication data (e.g., a password, token). In other embodiments, the secure authentication process may be a passive authentication where the user is not prompted to provide authentication data. In such embodiments, data may be retrieved from a user computing device (e.g., geolocation data) and compared to expected data.

The term "authorizing entity" may refer to an entity that can provide authorizations and/or authentications for an account. In some embodiments, the authorizing entity may be an issuer associated with an account of a user. In such embodiments, the authorizing entity may authorize a transaction.

The term "authorizing entity data" may refer to data associated with an authorizing entity. Authorizing entity data may include information regarding previous authentication and authorization processes associated with the authorizing entity, transaction data for past transactions, and types of authentication processes performed by the authorizing entity.

The term "merchant rules" may refer to rules associated with a merchant. Merchant rules may refer to one or more fraud detection rules that a user (e.g., a merchant) has selected or created and associated with a merchant profile. Once a user has selected or created one or more merchant rules, the merchant rules can be populated into the merchant profile. In some embodiments, the merchant rules may be a combination of business rules and velocity rules. In some embodiments, merchant rules may also be referred to as fraud detection rules.

The term "merchant computer" may include a computer associated with a merchant. Examples of merchant computers may include an access device, point of sale terminal, or a web server computer hosting a merchant Internet website. The merchant computer may be in any suitable form. Additional examples of merchant computers include any device capable of accessing the Internet, such as a personal computer, cellular or wireless phones, personal digital assistants (PDAs), tablet PCs, and handheld specialized readers.

The term "merchant interface" may include an interface for displaying information from a merchant. Examples of merchant interfaces may include a merchant mobile application or a merchant website displayed on an internet browser. The merchant interface may be hosted on a merchant web server computer and may allow a user to interact with a merchant system.

The term "database" may include any hardware, software, firmware, or combination of the preceding for storing and facilitating the retrieval of information. In addition, the database may use any of a variety of data structures, arrangements, and compilations to store and facilitate the retrieval of information.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

DETAILED DESCRIPTION

Embodiments of the present invention may be directed at integrating the process of verifying and authenticating payment devices, used in a transaction between a user and a merchant, into a fraud detection system. Embodiments of the present invention may allow merchants to establish merchant rules for transactions that determine whether a transaction should be processed through a secure authentication process based on the likelihood that the transaction will be subjected to an authentication challenge process. The merchant rules may be based on historical transaction data of previous transactions associated with each of a plurality of authorizing entities (e.g., issuers). In this manner, the merchant may be able to make a single message call to the fraud detection system for the transaction. Embodiments of the present invention may use an existing secure environment (e.g., Verified by Visa™, MasterCard SecureCode™, American Express SafeKey™).

Embodiments of the present invention may be used in transaction processing systems or may use data generated during transaction processing through a transaction processing system. Such embodiments may involve transactions between user and merchants.

I. Systems

FIG. 1 shows a block diagram of a transaction processing system 100 according to an embodiment of the present invention. The transaction processing system 100 in FIG. 1 includes a user computing device 102, a merchant computer 104, a fraud detection system 106, a directory server computer 108, an issuer computer 110, an acquirer computer 112, and a payment processing system 114. Each of these systems and computers may be in operative communication with each other via any suitable communication medium (including the Internet), using any suitable communications protocol.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

The user computing device 102 may be in any suitable form. For example, suitable user computing devices may be hand-held and compact so that they can fit into a user's pocket. Examples of user computing device 102 may include any device capable of accessing the Internet. Specific examples of user computing devices 102 include cellular or wireless phones (e.g., smartphones), tablet phones, tablet computers, laptop computers, desktop computers, personal digital assistants (PDAs), pagers, portable computers, smart cards, and the like. In some embodiments of the invention, the user computing device 102 and a payment device associated with the user may be a single device (e.g., a mobile phone).

The user computing device 102 may include a processor and a computer readable medium coupled to the processor, the computer readable medium comprising code, executable by the processor for performing the functionality described herein. The user computing device 102 may transmit data through the communications medium to the merchant computer 104. In some embodiments, the user computing device 102 may be communicatively coupled to the merchant computer 104 via a communications medium in order to conduct a transaction with a merchant associated with the merchant computer 104. The user computing device 102 may be in any suitable form.

The merchant computer 104 may include any suitable computational apparatus operated by a merchant. The merchant computer 104 may include a processor and a computer readable medium coupled to the processor, the computer readable medium comprising code, executable by the processor for performing the functionality described herein. Examples of merchant computer 104 may include an access device or a point of sale device. In some embodiments, the merchant computer 104 may include a web server computer that may host one or more websites associated with the merchant. In some embodiments, the merchant computer 104 may host data accessible by a mobile application stored on the user computing device 102. Additional examples of merchant computers include any device capable of accessing the Internet, such as a personal computer, cellular or wireless phones, personal digital assistants (PDAs), tablet computers, and handheld specialized readers.

In some embodiments, the merchant computer 104 may be configured to send data to the fraud detection system 106 as part of an authentication process for a transaction. In some embodiments, the merchant computer 104 may also be configured to generate authorization request messages for transactions between the merchant and user, and route the authorization request messages to the issuer computer 110 for additional transaction processing. The messages sent by the merchant computer 104 may be sent by a merchant plug-in module, which may function as a proxy between the merchant computer 104 and the issuer computer 110 or other components within the system.

Figure 2:
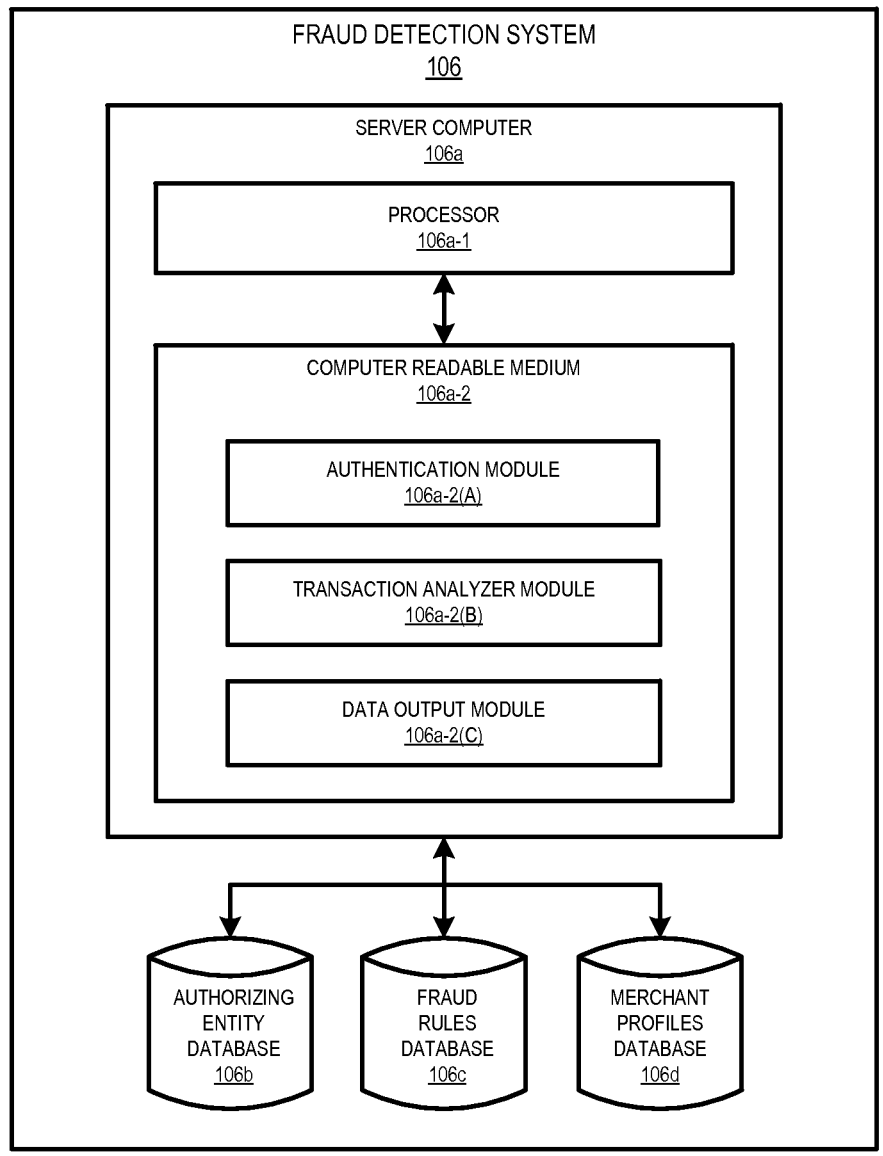
FIG. 2 shows a block diagram of a fraud detection system according to an embodiment of the present invention.

The fraud detection system 106, as depicted in FIG. 2, may include a server computer 106a or a network of suitable processing entities (e.g., computers) that may have the ability to receive, process and evaluate transaction data to provide fraud detection services. The server computer 106a may include a processor 106a-1 and a computer readable medium 106a-2 coupled to the processor 106a-1. The computer readable medium 106a-2 may comprise code, executable by the processor 106a-1 for performing the functionality described herein. The fraud detection system 106 may include a selection of merchant and/or issuer-defined fraud detection rules and merchant profiles that can be created, modified, and/or deleted.

The computer readable medium 106a-2 may comprise code for a plurality of modules, including an authentication module 106a-2(A), a transaction analyzer module 106a-2(B), and a data output module 106a-2(C).

The authentication module 106a-2(A) may be configured to handle the verification of authentication credentials (e.g., merchant identifier, user name, password) for a merchant or other user attempting to access the fraud detection system 106. The authentication module 106a-2(A) may access a merchant profiles database 106d in determining whether a merchant computer 104 seeking access to the fraud detection system 106 is an authorized user. For example, when presented with authentication credentials, the authentication module 106a-2(A) may access the merchant profiles database 106d to determine whether the provided user name is in the merchant profiles database 106d and whether the provided password corresponds to a stored password linked to the user name. The authentication process may be conducted when the merchant accesses the fraud detection system 106 to modify or create fraud detection rules, and/or when the merchant computer 104 sends transaction data for a transaction to the fraud detection system 106.

The transaction analyzer module 106a-2(B) may evaluate transaction data received by the fraud detection system 106 from the merchant computer 104. The transaction analyzer module 106a-2(B) may access an authorizing entity database 106b and retrieve data regarding the authorizing entity associated with the transaction data. For example, the transaction analyzer module 106a-2(B) may retrieve a bank identification number (BIN) for an issuer from the transaction data and retrieve data associated with the issuer.

The data output module 106a-2(C) may present the results of the transaction analysis conducted by the transaction analyzer module 106a-2(B) to the merchant. In some embodiments, the data output module 106a-2(C) may send a message to the merchant computer 104 indicating the likelihood of an authorizing entity performing an active authentication as part of a secure authentication process. In some embodiments, the data output module 106a-2(C) may send messages between the merchant computer 104 and the access control server computer 110a as part of the secure authentication process.

The fraud detection system 106 may include a plurality of databases, including an authorizing entity database 106B, a fraud rules database 106c, and a merchant profiles database 106d.

The authorizing entity database 106b may include a list of bank identification numbers (BINs) for one or more authorizing entities (e.g., issuers). The BINs may be used to match a received transaction message with the issuer of an account or payment device used in a transaction. The authorizing entity database 106b may also store past transaction histories associated with each of the authorizing entities, including transaction amounts, transaction results, authentication results, and authorization results. The past transaction histories may also indicate the type of authentication processes that were performed with each transaction. For example, the past transaction histories may indicate whether the authentication process was a passive authentication (e.g., using a user location or device fingerprint retrieved from the user computing device 102), or whether the user was prompted for a response to a challenge request as part of an active authentication (e.g., using a challenge message or static user id/password).

Based on the past transaction histories, each authorizing entity stored in the authorizing entity database 106b may include a value indicating the likelihood of an authentication process using a challenge to the user (e.g., an active authentication) being conducted by the issuer. For example, the likelihood of a particular authorizing entity performing an authentication process using an active authentication may be calculated by the fraud detection system 106 based on all (or a subset of all) the past transactions processed by the fraud detection system 106 associated with the particular authorizing entity. In other embodiments, the likelihood of a particular authorizing entity performing an active authentication process using a challenge may be obtained from a third party source or from the particular authorizing entity themselves. The value indicating the likelihood of authentications using a challenge to the user may be a score or percentage. In some embodiments, the likelihood value may be determined using a statistical analysis based historical transaction data, machine learning, or by another other appropriate algorithm.

The fraud rules database 106c may be used by the server computer 106a to store fraud detection rules that may be established by a merchant. The fraud detection rules (e.g., merchant rules) may be used to establish the conditions upon which transactions associated with the merchant should be processed through a secure authentication system, and which transactions should bypass the secure authentication system.

The merchant profiles database 106d may be used by the server computer 106a to store merchant profiles that are customized for each merchant that has created a profile with the fraud detection system 106. The merchant profiles database 106d may further store fraud detection rules that have been created for or by a merchant and associated with a merchant profile. The fraud detection rules associated with a merchant profile in the merchant profiles database 106d may be used to establish conditions for the processing of transactions. The fraud detection rules associated with a particular merchant may be retrieved from the merchant profiles database 106d using a merchant identifier associated with a received transaction.

Additional components that may be included in the fraud detection system 106 are described in co-pending U.S. patent application Ser. No. 13/451,431, filed Apr. 19, 2012, U.S. patent application Ser. No. 13/458,910, filed Apr. 27, 2012, and U.S. patent application Ser. No. 13/730,581, filed Dec. 28, 2012, which are herein incorporated by references in their entirety for all purposes.

Returning to FIG. 1, the directory server computer 108 may be a computer configured to route messages from the merchant computer 104 to the access control server computer 110a, as well as messages from the access control server computer 110a to the merchant computer 104. The directory server computer 108 may include a processor and a computer readable medium coupled to the processor, the computer readable medium comprising code, executable by the processor for performing the functionality described herein. In other embodiments, the directory server computer 108 may route messages between the fraud detection system 106, on behalf of the merchant computer 104, and the issuer computer 110. In some embodiments, the directory server computer 108 may be operated by a payment processing system 114.

The issuer computer 110 is typically associated with a business entity (e.g., a bank) which issues and maintains user accounts for users. The issuer computer 110 may include a processor and a computer readable medium coupled to the processor, the computer readable medium comprising code, executable by the processor for performing the functionality described herein. The issuer computer 110 may issue payment devices for the user account, including credit cards and debit cards, and/or may provide user accounts stored and accessible via the user computing device 102 of the user. The issuer computer may include an access control server computer 110a.

The access control server computer 110a may include a computer configured to conduct authentication and authorization processes. The access control server computer 110a may include a processor and a computer readable medium coupled to the processor, the computer readable medium comprising code, executable by the processor for performing the functionality described herein. The access control server computer 110a may be associated with an issuer, which can be any bank or authorizing entity that issues and maintains an account for a user. The access control server computer 110a may validate (or authenticate) an account associated with the user. The access control server computer 110a may use a PAN, computing device data, payment device data, geolocation data, user data, transaction data, account data, or other comparable data, in order to authenticate the user and the account. In some embodiments, at the time of a transaction, the access control server computer 110a may further perform user authentication processes, including a secure authentication process, and may provide digitally signed responses to the merchant computer 104 through the directory server computer 108. In other embodiments, the access control server computer 110a may send responses back directly to the user computing device 102.

The acquirer computer 112 is typically associated with a business entity (e.g., a commercial bank) that has a business relationship with a particular merchant or other entity and that may be involved in the process of transaction. The acquirer computer 112 may include a processor and a computer readable medium coupled to the processor, the computer readable medium comprising code, executable by the processor for performing the functionality described herein. The acquirer computer 112 may issue and manage accounts for merchants and exchange funds with the issuer computer 110 on behalf of the merchant.

Some entities can perform both issuer computer 110 and acquirer computer 112 functions. Embodiments of the present invention encompass such single entity issuer-acquirer computers. The payment processing system 114 may provide transaction authorization and clearing and settlement services between the acquirer computer 112 and the issuer computer 110 for standard payment transactions.

The payment processing system 114 may be a computer or network of computers that includes or operates at least one server computer used for payment processing. The server computer in the payment processing system 114 may include a processor and a computer readable medium coupled to the processor, the computer readable medium comprising code, executable by the processor for performing the functionality described herein. In some embodiments, the server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments, the payment processing system 114 may operate multiple server computers. In such embodiments, each server computer may be configured to process transactions for a given region or handle transactions of a specific type based on transaction data.

The payment processing system 114 may include data processing subsystems, networks, and operations used to support and deliver authorization services, exception file services, and clearing and settlement services. An exemplary payment processing system 114 may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The payment processing system 114 may use any suitable wired or wireless network, including the Internet.

The payment processing system 114 may process transaction request messages and determine the appropriate destination (e.g., issuer computer) for the transaction request messages. The payment processing system 114 may also handle and/or facilitate the clearing and settlement of transactions.

II. Methods

Figure 3:
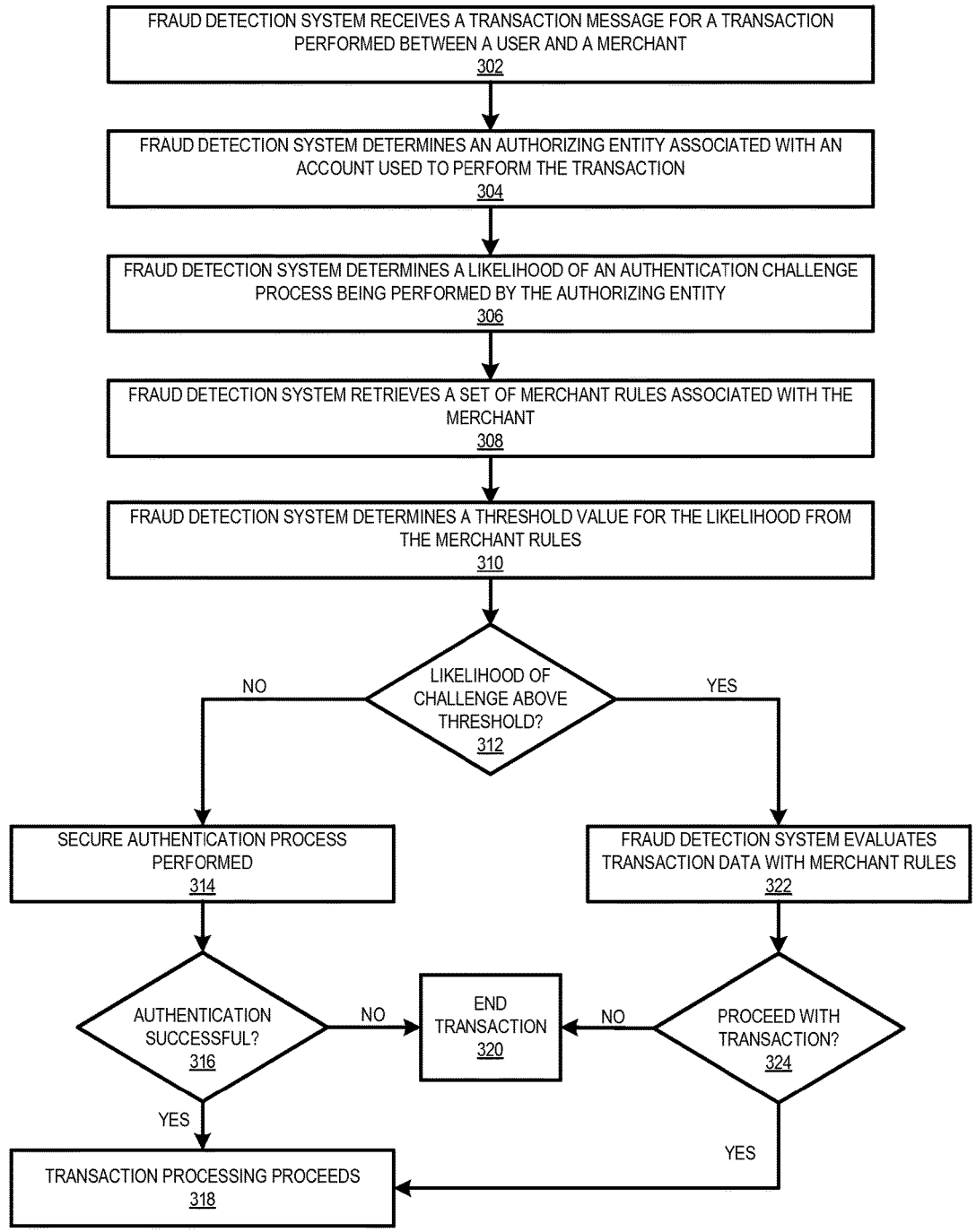
FIG. 3 shows a flowchart of a method of integrating a secure authentication process into a fraud detection system according to an embodiment of the present invention.

FIG. 3 shows a flowchart 300 of a method of integrating a secure authentication process into a fraud detection system (e.g., 106) according to an embodiment of the present invention. Additional methods and processes may be included within these methods and may be recognized by one of ordinary skill in the art, in light of the description below. Further, in some embodiments of the present invention, the described methods may be combined, mixed, and matched, as one of ordinary skill would recognize.

At step 302, the fraud detection system 106 receives a transaction message for a transaction performed between a user and a merchant. A user may access a merchant's website using a browser stored on the user computing device 102. In other embodiments, the user may access a mobile application associated with the merchant and stored on the user computing device 102. The merchant's website and/or merchant data accessible using the mobile application may be hosted on a merchant computer 104 (e.g., a web server computer). Once the user has selected goods or services via the merchant's website or mobile application, the user may proceed through a checkout process. For example, the user may select a "Buy" or "Checkout" option.

The user computing device 102 may be configured to send data as part of the checkout process. The data may include user computing device data, payment device data including a bank identification number (BIN), geolocation data, user address, user email address, user phone number, transaction data, account data, or other comparable data associated with the transaction and/or the user. The merchant computer 104 may then be configured to transmit the transaction message (or the data contained within the transaction message) to the fraud detection system 106.

In some embodiments, where the transaction is a non-financial transaction, the user computing device 102 may be used to perform an access operation to access a computer system or a venue. In such embodiments, the user computing device 102 may send data indicating an authorizing entity associated with an account of the user, geolocation data, user data, and geolocation data, among other data.

At step 304, the fraud detection system 106 determines an authorizing entity associated with the account used to perform the transaction. In some embodiments, where the transaction is a payment transaction, the fraud detection system 106 may query an authorizing entity database using an authorizing entity identifier (e.g., a BIN associated with an issuer of the account received in the transaction message). The BIN received in the transaction message may be used to match the transaction message with the issuer (e.g., bank) of the payment device or account used in the transaction. The authorizing entity database 106b may also store historical transaction data associated with each BIN, including transaction amounts, transaction results, authentication results, authentication processes performed, and authorization results.

At step 306, the fraud detection system 106 determines the likelihood of an authentication challenge process (e.g., an active authentication using a challenge to the user) being performed by the authorizing entity. Using the historical transaction data, the fraud detection system 106 may determine the type of authentication process the determined authorizing entity performed for each transaction in the historical transaction data.

The fraud detection system 106 may perform a statistical analysis based on the historical transaction data to calculate the likelihood of the current transaction being subjected to the authentication challenge process. The fraud detection system 106 may determine from the historical transaction data whether the authorizing entity is more likely to use an active authentication or a passive authentication.

An active authentication is where the user has enrolled with the authorizing entity and either has a unique, static user name and password, or is subjected to a challenge request and challenge response process. A passive authentication is where the authorizing entity (e.g., the issuer computer 110 or any other computer that may perform the authentication process on behalf of the issuer) uses data associated with the user that is on file (e.g., address, CVV2, location data, device fingerprint data, which do not require user enrollment or a specific id/password). The passive authentication process may not require the user to be prompted or challenged to provide any data.

For example, authorizing entity A, associated with a first authorizing entity identifier may have a 75% likelihood of sending an active authentication to the user. Authorizing entity B, associated with a second authorizing entity identifier may have 10% likelihood of authorizing entity B sending an active authentication to the user. In some embodiments, the likelihood value may be determined from all transactions associated with the authorizing entity, including transactions for a plurality of users. In other embodiments, the likelihood value may be determined based on previous transactions performed by the user with the authorizing entity.

At step 308, the fraud detection system 106 retrieves a set of merchant rules associated with the merchant. The merchant rules may be stored in the merchant profiles database 106d. In some embodiments, the transaction message may include a merchant identifier (e.g., a merchant name, a merchant number). The appropriate merchant rules may be retrieved from the merchant profiles database 106d using the merchant identifier. The merchant rules may include at least one rule that defines how the merchant wants transactions processed based on the likelihood of an authentication challenge process being performed by the authorizing entity.

At step 310, the fraud detection system 106 determines a threshold value for the likelihood from the merchant rules. For example, a merchant rule may define a threshold value. The threshold value may define a boundary value where transactions with likelihood values higher than the threshold value indicate that there is higher likelihood that the transaction will be subjected to an authentication challenge process as part of the secure authentication process, and where transactions with likelihood values lower than the threshold value may indicate that there is a smaller likelihood that the transaction will be subjected to the authentication challenge process as part of the secure authentication process.

At step 312, the fraud detection system 106 determines whether the likelihood of an authentication challenge process is above the threshold value established by the merchant. When the likelihood of the authentication challenge process is above the threshold value, the process may proceed to step 322. When the likelihood of the authentication challenge process is below the threshold value, the process may further include determining whether the secure authentication process should be performed based on merchant rules (e.g., specific rules used when the likelihood is below the threshold value or general merchant rules based on transaction characteristics). The process may then proceed to step 314.

At step 314, the secure authentication process is performed. When the likelihood of a challenge is low and/or below the merchant-defined threshold value, the secure authentication process may be performed as it provides an indication that the authorizing entity is more likely to perform a passive authentication that is transparent to the user versus an active authentication. Merchant rules may indicate that the secure authentication process should be invoked in such situations because the risk of user abandonment of the transaction is low. In such embodiments, the secure authentication process may be performed for the transaction regardless of any risk level determined for the transaction using the merchant rules.

The secure authentication process may include the merchant computer 104 generating and sending a verify enrollment request message through the directory server computer 108 to the access control server computer 110a associated with the appropriate issuer computer 110. The access control server computer 110a may then send a verify enrollment response message back to the merchant computer 104 through the directory server computer 108 indicating whether the user is enrolled in secure authentication. In some embodiments, the fraud detection system 106 may generate and send the verify enrollment request message on behalf of the merchant computer 104.

In some embodiments, the fraud detection system 106 may be provided with the results of the verify enrollment process and may perform additional decisioning as to whether to continue the process. For example, the fraud detection system 106 may evaluate the result and provide an "ACCEPT", "REJECT" or "REVIEW" response. When the result from the fraud detection system 106 is an "ACCEPT", the transaction may proceed to the next step (step 318), including an authorization process. When the result from the fraud detection system 106 is a "REJECT", the transaction may be stopped from further processing and the merchant may be informed that the transaction will not be processed (step 320).

When the result from the fraud detection system 106 is a "REVIEW", this may indicate that a manual review of the transaction is required. In such embodiments, additional merchant rules for the merchant may be queried to determine how the transaction should proceed. For example, where the result from the fraud detection system 106 is a "REVIEW", the process may continue as though the result were an "ACCEPT" if the transaction amount is below a merchant-defined value, if the transaction is a regular or scheduled transaction, if the account has no prior history of fraud, or any other criteria that a merchant may establish. In some embodiments, a similar evaluation by the fraud detection system 106 may be conducted at multiple points throughout the transaction authentication and authorization processes.

When the fraud detection system 106 indicates the authentication process should proceed, the merchant computer may then re-direct the browser stored on the user computing device 102 to the access control server computer 110a. In some embodiments, a mobile application may be re-directed to the access control server computer 110a. In some embodiments, the authentication process may be performed by a computer associated with a payment processing system 114, or by a third-party computer, on behalf of the authorizing entity. In such embodiments, the authorizing entity may define rules or establish requirements for how the authentication process is to be conducted. In some embodiments, the authorizing entity database 106b at the fraud detection system 106 may store the data for re-directing the browser to the access control server computer 110a. A payer authentication process may then be performed.

In a passive authentication process, a payer authentication request may request transaction location data, user computing device data, or user data contained in the transaction message. The data may be provided by the merchant computer 104 or retrieved from the user computing device 102 by the access control server computer 110a. In such scenarios, the user may not be prompted to provide any additional data. For example, the retrieved user computing device data may indicate that the user computing device 102 and the transaction is being performed in New York, when all prior transactions of the user have been in California. This may be an indicator that the transaction is potentially fraudulent.

In such embodiments, an indication may be provided to the merchant computer 104 associated with the merchant that a passive authentication process will be performed. The merchant computer 104 may optionally modify a displayed merchant interface (e.g., the merchant website, the displayed interface on the mobile application) based on the indication of the passive authentication. For example, the merchant may want to provide the user with an indication that authentication is in process and to stand-by. In other situations, the merchant may not provide any indication that an authentication process is being performed to prevent the user from stopping the transaction prematurely.

In an active authentication process, where the access control server computer 110a may prompt the user, the user may be required to provide a user name and password, or provide a response to a challenge question (e.g., mother's maiden, date of birth, phone number). In such embodiments, a pop-up window or other prompt may provide a payer authentication request message to the user, prompting the user to provide a response. The user response is sent as a payer authentication response message to the access control server computer 110a.

In some embodiments, when the merchant is informed that an active authentication process will be performed, the merchant may modify the displayed interface to minimize any indication that the active authentication process is being performed by another computer.

In both the passive authentication process and the active authentication process, the payer authentication response message provided by the user to the payer authentication request message may then be compared to an expected response based on data stored by the access control server computer 110a. For example, the access control server computer 110a may determine whether a received password matches the expected stored password. In some embodiments, the response provided in the payer authentication response message may be considered to match the expected response when they are within a predefined range of each other. Based on the comparison, the access control server computer 110a may make a determination as to whether the user has been authenticated.

At step 316, the results of the secure authentication process may be provided to the fraud detection system 106. Based on the results of the secure authentication process, the transaction may proceed or may be halted. Determining whether the authentication was successful may be based solely on the result of the secure authentication process.

In some embodiments, determining whether the authentication was successful (and whether the transaction should proceed) may also be based on the merchant rules associated with the merchant computer 104. In such embodiments, even when the result of the secure authentication process indicates that the authentication was successful, additional merchant rules may still prevent the transaction from proceeding. For example, when a transaction amount for the transaction is higher than a merchant-defined value or the transaction originated from a country with significant fraud risks, one or more merchant rules may prevent the transaction from proceeding.

At step 318, when the authentication process is successful, transaction processing for the transaction may proceed. The transaction may then proceed through an authorization process. The authorization process may involve the merchant computer 104 generating an authorization request message and sending the authorization request message to an issuer computer 110 through an acquirer computer 112 and a payment processing system 114. Upon the merchant computer 104 receiving an authorization response message from the issuer computer 110, indicating the result of the authorization process, the merchant can either finalize the transaction or stop the transaction.

At step 320, when the authentication process is unsuccessful, the transaction may be ended or halted, as the failed authentication may be an indication that the transaction was fraudulently initiated. In some embodiments, the merchant computer 104 may be informed by the fraud detection system 106 that the authentication process for the transaction was unsuccessful and the transaction has been ended.

At step 322, when the likelihood of the authentication challenge process is above the threshold, the fraud detection system 106 evaluates merchant rules. In some embodiments, when the likelihood of the authentication challenge process (e.g., an active authentication) is above the threshold, a secure authentication process may not be performed as the merchant associated with the transaction may not want to risk the user abandoning the transaction as a result of being prompted for a response to a challenge request message or if the user has forgotten their user name or password. In such embodiments, the fraud detection system 106 may evaluate other criteria associated with the transaction, based on the merchant rules associated with the merchant computer 104.

In some embodiments, the fraud detection system 106 may evaluate individual transaction characteristics, and based on evaluating the transaction characteristics against related merchant rules, determine whether the transaction should proceed through the secure authentication process. The transaction characteristics may be individual elements of the transaction. For example, the transaction amount, product categories, merchant name, merchant location, transaction date/time, billing address, shipping address, the transaction history for the user, the transaction history of the account, fraud indicators related to the merchant or the items in the transaction, or any other information based on the transaction data retrieved from the transaction message.

The merchant may define merchant rules related to one or more of these transaction characteristics, and the transaction characteristics for a transaction may be evaluated against these merchant rules. For example, Merchant A may have a first merchant rule that if the transaction amount is less than $20, the transaction may be accepted without proceeding through the secure authentication process. Merchant A may also have a second merchant rule stating that if the transaction amount is greater than $100 and the transaction time is between midnight and 6 a.m., the transaction should proceed through the secure authentication process because it may be a higher risk transaction.

As another example, if there has been no fraudulent activity associated with the user, or if the transaction history for the user indicates the transaction is a recurring transaction that has not previously had any fraud indicators, the merchant rules may allow the transaction to proceed without proceeding through the secure authentication process. In such scenarios, the merchant may consider the transaction authenticated, bypassing the secure authentication proceed and may proceed through an authorization process. In contrast, if the transaction total is greater than a merchant-defined value, or the transaction originated from a country with high levels of fraud, the merchant rules may not allow the transaction to proceed unless the secure authentication process is performed (or, alternatively, may end or terminate the transaction). Thus, even when the likelihood of the authentication challenge process is above the threshold, the merchant may determine that the secure authentication process should be performed.

In other embodiments, the fraud detection system 106 may determine a risk level for the transaction. In such embodiments, the fraud detection system 106 may use one or both of stored risk data and external risk data in order to determine the risk level for the transaction. The risk level for the transaction may be a numerical score, such as a number from zero to 100, or a percentage value. In such embodiments, the merchant may establish a merchant-defined risk level, including through a merchant rule. The merchant-define risk level may be associated with the merchant in the merchant profiles database 106d.

In some embodiments, the transaction may be sent through the secure authentication process when the risk level for the transaction is above the merchant-defined risk level. In such embodiments, this may occur as it may be considered a risky transaction and thus the merchant may require the additional authentication processes provided by the secure authentication process, regardless of whether there is a high likelihood of the user being challenged through an authentication challenge process. In some embodiments, when the risk level of the transaction is below the merchant-defined risk level, the secure authentication process may be bypassed, as the transaction may be considered less risky or not risky. In such situations, the transaction may be sent through the authorization process without any additional authentication processes.

At step 324, based on the merchant rules associated with the merchant computer 104, the fraud detection system 106 may determine whether the transaction should proceed or be halted. When the merchant rules indicate that the transaction should proceed, the process continues to step 318.

In some embodiments, the transaction proceeding may include performing the secure authentication process as described above. In some embodiments, this may occur where the likelihood of a challenge was above the merchant-defined threshold value and a risk level for the transaction was higher than a merchant-defined risk level. In such embodiments, a transaction that may have otherwise been rejected for having a high risk level may be allowed to proceed to the transaction authorization process by the merchant if the transaction is sent through the secure authentication process and successfully passes an authentication challenge process.

In some embodiments, the transaction proceeding may include bypassing the secure authentication process and proceeding to a transaction authorization process, as described above. When the merchant rules indicate that the transaction should not proceed, the process continues to step 320, and the transaction is terminated.

Accordingly, embodiments of the present invention may provide a number of advantages and technical benefits. For example, embodiments of the present invention provide the benefit of minimizing the messages that are required in order to perform a transaction process by leveraging the data stored by a fraud detection system. By integrating the decision of whether to perform a secure authentication process into the fraud detection system, the process does not require as many messages from the merchant to the fraud detection system for each single transaction. This requires fewer resources and results in less network congestion than would be required through having to perform the process using more messages.

In addition, by determining the likelihood of a secure authentication process being an active authentication versus a passive authentication, a merchant may use the information to modify a merchant displayed interface on a merchant website or a merchant mobile application. By modifying the displayed interface, the merchant may be able to minimize the visual disruption to the user from the secure authentication process.

III. Example Computer Systems

The various participants and elements described herein may operate one or more computer apparatuses to facilitate the functions described herein. Any of the elements in the figures, including any servers or databases, may use any suitable number of subsystems to facilitate the functions described herein.

Figure 4:
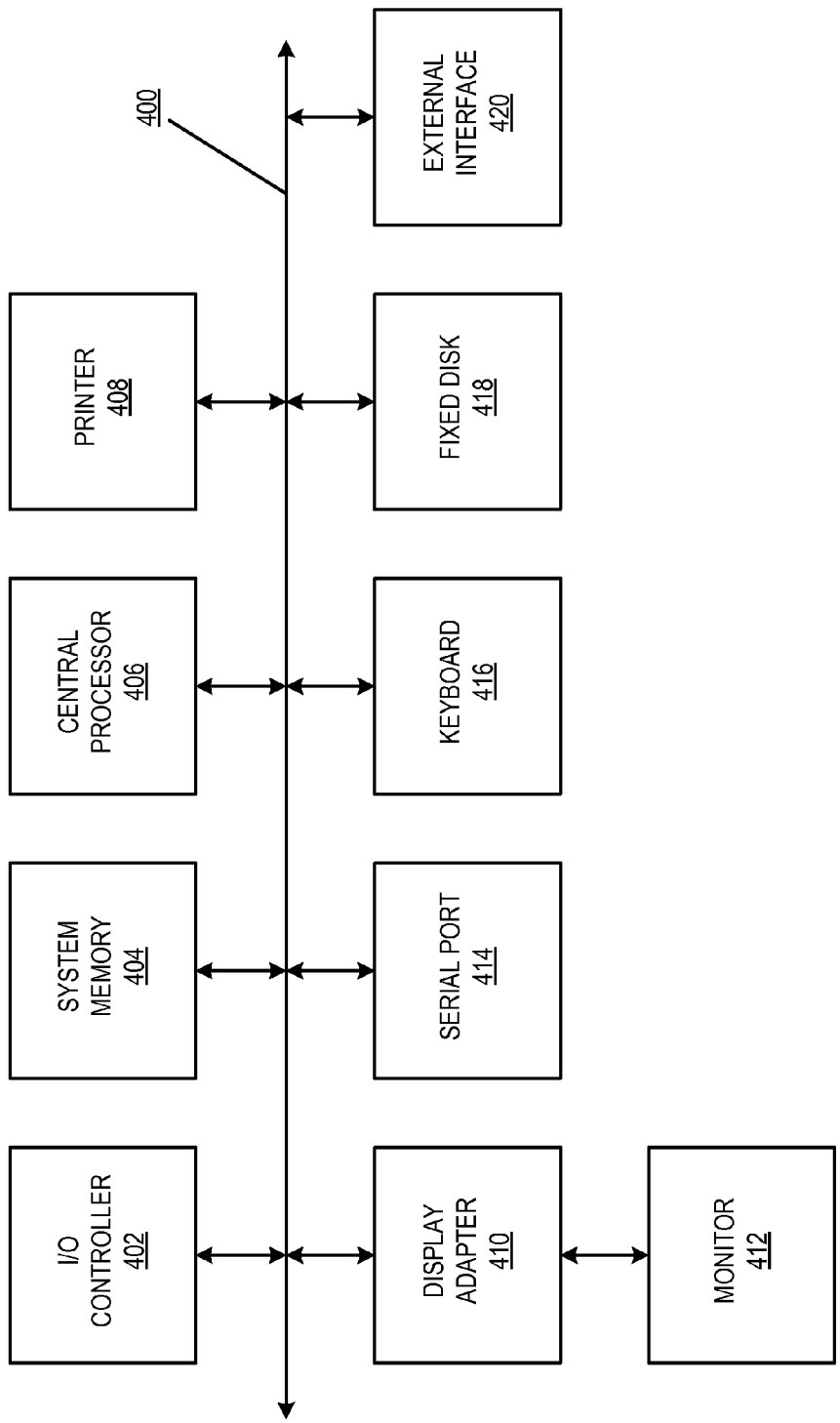
FIG. 4 shows an exemplary block diagram of a computer apparatus according to an embodiment of the present invention.

Examples of such subsystems or components are shown in FIG. 4. Any of the subsystems or components shown in FIG. 8 can be included in any of the previously described devices, apparatuses, or systems. The subsystems shown in FIG. 4 are interconnected via a system bus 400. Additional subsystems such as a printer 408, keyboard 416, fixed disk 418 (or other memory comprising computer readable media), monitor 412, which is coupled to display adapter 410, and others are shown. Peripherals and input/output (I/O) devices, which couple to I/O controller 402 (which can be a processor or other suitable controller), can be connected to the computer system by any number of means known in the art, such as serial port 414. For example, serial port 414 or external interface 420 can be used to connect the computer apparatus to a wide area network such as the Internet, a mouse input device, or a scanner. The interconnection via system bus allows the central processor 406 to communicate with each subsystem and to control the execution of instructions from system memory 404 or the fixed disk 418, as well as the exchange of information between subsystems. The system memory 404 and/or the fixed disk 418 may embody a computer readable medium.

Specific details regarding some of the above-described aspects are provided above. The specific details of the specific aspects may be combined in any suitable manner without departing from the spirit and scope of embodiments of the technology. For example, back end processing, data analysis, data collection, and other transactions may all be combined in some embodiments of the technology. However, other embodiments of the technology may be directed to specific embodiments relating to each individual aspect, or specific combinations of these individual aspects.

It should be understood that the present technology as described above can be implemented in the form of control logic using computer software (stored in a tangible physical medium) in a modular or integrated manner. While the present invention has been described using a particular combination of hardware and software in the form of control logic and programming code and instructions, it should be recognized that other combinations of hardware and software are also within the scope of the present invention. Based on the disclosure and teachings provided herein, a person of ordinary skill in the art will know and appreciate other ways and/or methods to implement the present technology using hardware and a combination of hardware and software Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the technology will become apparent to those skilled in the art upon review of the disclosure. The scope of the technology should, therefore, be determined not with reference to the above description, but instead should be determined with reference to the pending claims along with their full scope or equivalents.

In some embodiments, any of the entities described herein may be embodied by a computer that performs any or all of the functions and steps disclosed.

One or more features from any embodiment may be combined with one or more features of any other embodiment without departing from the scope of the technology.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
receiving, by a server computer, a transaction message for a transaction performed between a user device and a merchant computer;
performing, by the server computer, a query at an authorizing entity database for an authorizing system associated with an account used to perform the transaction, wherein the query is performed based on an authorizing entity identifier received in the transaction message;
determining, by the server computer, a likelihood of an authentication challenge process being performed by the authorizing system based on historical transaction data from previous transactions processed by the authorizing system;
retrieving, by the server computer, a set of merchant rules associated with the merchant computer from a merchant database;
based on the set of merchant rules, determining, by the server computer, a threshold value for the likelihood of the authentication challenge process;
initiating, by the server computer, a secure authentication process when the likelihood of the authentication challenge process being performed by the authorizing system is below a likelihood threshold value, the secure authentication process involving a directory server computer configured to route authentication messages between the merchant computer and an access control server computer of the authorizing system to enable the access control server computer to provide a challenge to the user device; and
routing, by the server computer, an authorization request message for the transaction directly to the authorizing system when the likelihood of the authentication challenge process being performed by the authorizing system is above a likelihood threshold value and a risk level assessed for the transaction is below a risk threshold established in the set of merchant rules.

2. The method of claim 1, wherein determining the likelihood of the authentication challenge process being performed by the authorizing system comprises:
accessing, by the server computer, the authorizing entity database;
retrieving, by the server computer, authorizing entity data from the authorizing entity database using the authorizing entity identifier, the authorizing entity data including the historical transaction data from previous transactions processed by the authorizing system;

analyzing, by the server computer, transaction data for the transaction with the historical transaction data retrieved from the authorizing entity database; and determining, by the server computer, a likelihood value of the authentication challenge process being performed by the authorizing system based on the analysis of the transaction data.

3. The method of claim 2, wherein the likelihood value of the authentication challenge process being performed by the authorizing system is determined based on transaction history of a user of the user device.

4. The method of claim 2, wherein the analysis of the transaction data to determine the likelihood value is performed using a machine learning model of the historical transaction data.

5. The method of claim 1, wherein determining whether to send the transaction through the secure authentication process further comprises:

when the likelihood of the authentication challenge process is above the threshold value, evaluating, by the server computer, transaction data for the transaction with the set of merchant rules to determine whether to send the transaction through the secure authentication process.

6. The method of claim 5, wherein evaluating the transaction data for the transaction with the set of merchant rules further comprises:

for each of a plurality of transaction characteristics in the transaction data:

evaluating, by the server computer, a transaction characteristic from the transaction data with a merchant rule associated with the transaction characteristic, and using a result of the evaluation, determining, by the server computer, that there is sufficient data to recommend sending the transaction through the secure authentication process.

7. The method of claim 5, wherein evaluating the transaction data for the transaction with the set of merchant rules further comprises:

determining, by the server computer, the risk level assessed for the transaction; and performing, by the server computer, the secure authentication process when the risk level assessed for the transaction is above the risk threshold established in the set of merchant rules.

8. The method of claim 5, wherein the likelihood of the authentication challenge process being below the threshold value indicates a passive authentication, and wherein the likelihood of the authentication challenge process being above the threshold value indicates an active authentication.

9. The method of claim 8, further comprising:

performing, by the server computer, the active authentication, the active authentication including:

sending, by the server computer, a challenge request message to the user device, receiving, by the server computer, a challenge response message from the user device, and determining, by the server computer, that the challenge response message received from the user device matches an expected response.

10. The method of claim 8, further comprising:

performing, by the server computer, the passive authentication, the passive authentication including:

providing, by the server computer, an indication to the merchant computer of the passive authentication, wherein the merchant computer modifies a displayed merchant interface based on the indication of the passive authentication, retrieving, by the server computer, user data from the user device, and determining, by the server computer, that the transaction is authenticated when the user data retrieved from the user device matches user data stored in a user database.

11. A server computer comprising:

a processor; and a computer readable medium coupled to the processor, the computer readable medium comprising code, executable by the processor, to implement a method comprising:

receiving a transaction message for a transaction performed between a user device and a merchant computer;

performing a query at an authorizing entity database for an authorizing system associated with an account used to perform the transaction, wherein the query is performed based on an authorizing entity identifier received in the transaction message;

determining a likelihood of an authentication challenge process being performed by the authorizing system based on historical transaction data from previous transactions processed by the authorizing system;

retrieving a set of merchant rules associated with the merchant computer from a merchant database;

based on the set of merchant rules, determining a threshold value for the likelihood of the authentication challenge process;

initiating, a secure authentication process when the likelihood of the authentication challenge process being performed by the authorizing system is below a likelihood threshold value, the secure authentication process involving a directory server computer configured to route authentication messages between the merchant computer and an access control server computer of the authorizing system to enable the access control server computer to provide a challenge to the user device; and routing an authorization request message for the transaction directly to the authorizing system when the likelihood of the authentication challenge process being performed by the authorizing system is above a likelihood threshold value and a risk level assessed for the transaction is below a risk threshold established in the set of merchant rules.

12. The server computer of claim 11 wherein determining the likelihood of the authentication challenge process being performed by the authorizing system comprises:

accessing the authorizing entity database;

retrieving authorizing entity data from the authorizing entity database using the authorizing entity identifier, the authorizing entity data including the historical transaction data from previous transactions process by the authorizing system;

analyzing transaction data for the transaction with the historical transaction data retrieved from the authorizing entity database; and determining a likelihood value of the authentication challenge process being performed by the authorizing system based on the analysis of the transaction data.

13. The server computer of claim 12, wherein the likelihood value of the authentication challenge process being performed by the authorizing system is determined based on transaction history of a user of the user device.

14. The server computer of claim 11, wherein determining whether to send the transaction through the secure authentication process further comprises:
when the likelihood of the authentication challenge process is above the threshold value, evaluating transaction data for the transaction with the set of merchant rules to determine whether to send the transaction through the secure authentication process.

15. The server computer of claim 14, wherein evaluating the transaction data for the transaction with the set of merchant rules further comprises:
for each of a plurality of transaction characteristics in the transaction data:
evaluating a transaction characteristic from the transaction data with a merchant rule associated with the transaction characteristic, and
using a result of the evaluation, determining that there is sufficient data to recommend sending the transaction through the secure authentication process.

16. The server computer of claim 14, wherein evaluating the transaction data for the transaction with the set of merchant rules further comprises:
determining the risk level assessed for the transaction; and
performing the secure authentication process when the risk level assessed for the transaction is above the risk threshold established in the set of merchant rules.

17. The server computer of claim 14, wherein the likelihood of the authentication challenge process being below the threshold value indicates a passive authentication, and wherein the likelihood of the authentication challenge process being above the threshold value indicates an active authentication.

18. The server computer of claim 17, wherein the code, executable by the processor, further implements:
performing, by the server computer, the active authentication, the active authentication including:
sending a challenge request message to the user device,
receiving a challenge response message from the user device, and
determining that the challenge response message received from the user device matches an expected response.

19. The server computer of claim 17, wherein the code, executable by the processor, further implements:
performing the passive authentication, the passive authentication including:
providing an indication to the merchant computer of the passive authentication, wherein the merchant computer modifies a displayed merchant interface based on the indication of the passive authentication,
retrieving user data from the user device, and
determining that the transaction is authenticated when the user data retrieved from the user device matches user data stored in a user database.

* * * * *